United States Patent
Hsu et al.

(10) Patent No.: US 8,201,145 B2
(45) Date of Patent: Jun. 12, 2012

(54) SYSTEM AND METHOD FOR WORKFLOW-DRIVEN DATA STORAGE

(75) Inventors: Windsor Hsu, San Jose, CA (US); Lesley W. Mbogo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/939,364

(22) Filed: Nov. 13, 2007

(65) Prior Publication Data

US 2009/0125884 A1 May 14, 2009

(51) Int. Cl.
*G06F 9/44* (2006.01)
(52) U.S. Cl. ............... 717/120; 717/102; 707/812
(58) Field of Classification Search .............. None
See application file for complete search history.

(56) References Cited

U.S. PATENT DOCUMENTS

| | | | | |
|---|---|---|---|---|
| 5,301,314 A * | 4/1994 | Gifford et al. | ................... | 1/1 |
| 5,530,861 A | 6/1996 | Diamant et al. | | |
| 5,960,200 A | 9/1999 | Anand et al. | | |
| 6,269,380 B1 * | 7/2001 | Terry et al. | ................... | 1/1 |
| 6,324,551 B1 * | 11/2001 | Lamping et al. | ............. | 715/229 |
| 6,330,572 B1 * | 12/2001 | Sitka | ......................... | 707/608 |
| 6,516,320 B1 | 2/2003 | Odom et al. | | |
| 6,944,630 B2 * | 9/2005 | Vos et al. | ............... | 1/1 |
| 6,963,959 B2 * | 11/2005 | Hsu et al. | ..................... | 711/165 |
| 6,973,616 B1 | 12/2005 | Cottrille et al. | | |
| 7,020,758 B2 * | 3/2006 | Fisk | ............................ | 711/172 |
| 7,284,150 B2 * | 10/2007 | Ma et al. | ..................... | 714/6.23 |
| 7,305,379 B2 * | 12/2007 | Goyal et al. | ........................ | 1/1 |
| 7,509,420 B2 * | 3/2009 | Moulton et al. | ............. | 709/226 |
| 7,529,762 B2 * | 5/2009 | Casati et al. | ................... | 705/301 |
| 7,831,563 B2 * | 11/2010 | Brown et al. | ................. | 707/648 |
| 7,904,400 B2 * | 3/2011 | Bussert et al. | ................. | 706/45 |
| 2001/0034812 A1 * | 10/2001 | Ignatius et al. | ............... | 711/112 |
| 2005/0177541 A1 * | 8/2005 | Wright et al. | ..................... | 707/1 |
| 2005/0197885 A1 | 9/2005 | Tam et al. | | |
| 2005/0210063 A1 | 9/2005 | Koenig | | |
| 2006/0036566 A1 | 2/2006 | Simske et al. | | |
| 2006/0075294 A1 * | 4/2006 | Ma et al. | ......................... | 714/13 |
| 2006/0117315 A1 | 6/2006 | Bussert et al. | | |
| 2006/0218176 A1 * | 9/2006 | Sun et al. | ..................... | 707/102 |

* cited by examiner

*Primary Examiner* — Lewis A Bullock, Jr.
*Assistant Examiner* — Christine Dang
(74) *Attorney, Agent, or Firm* — Cantor Colburn LLP; Mohammed Kashef

(57) ABSTRACT

Programs, systems and methods are described for efficiently storing data as used under a workflow-driven model. A workflow process is defined to control the processing of data objects through different states, e.g., such as an insurance claim document passing through different stages of processing. The workflow process is modeled and employed to manage the storage system based upon predicted state changes derived from state statistics that can be applied to enhance efficiency. For example, copies of the data object may be automatically made when the data object is expected to change state. Some anticipated states implicating high access may direct a storage location with low access time. Hints or requirements for the data object may be applied upon occurrence of an expected state change. Storage management of expected state changes may be further enhanced through dynamic adjustment of the state statistics using collected historical state information to further enhance efficiency.

14 Claims, 6 Drawing Sheets

SYSTEM AND METHOD FOR WORKFLOW-DRIVEN DATA STORAGE

CROSS-REFERENCE TO RELATED APPLICATION

This application is related to U.S. patent application Ser. No. 11/561,394, by Brannon et al. filed Nov. 18, 2006, and entitled "BUSINESS-SEMANTIC-AWARE INFORMATION LIFECYCLE MANAGEMENT."

BACKGROUND OF THE INVENTION

1. Field of the Invention

This invention relates to data storage. Particularly, this invention relates to managing efficient storage of data objects related to a workflow model.

2. Description of the Related Art

In the information-driven society today, organizations are collecting and accumulating more data than ever before. Properly storing the huge amounts of resulting data can be both expensive and complicated. In practice, the stored data have differing storage requirements and value to the organization. If each data object, such as a file, were to be handled in accordance with its requirements and value to the organization, the cost and complexity of retaining the data would be significantly reduced.

The key challenge lies in determining the requirements and value of the objects. Traditional Hierarchical Storage Management (HSM) approaches rely on the access history of the objects, but such management is not very effective, especially for large archival systems where the accesses do not exhibit much locality of reference. Another approach infers the likelihood that an object will be accessed based on metadata characteristics such as the type of object, who created the object, when it was created and other metrics. This also has limited effectiveness. Another proposal is to have the user or some other external entity (such as an associated business process) specify the value of each of the objects. The external entity, however, typically has neither such knowledge nor the wherewithal to do so. Some techniques for data storage management have been developed.

U.S. Patent Application Publication No. 2006/0117315 A1 by Bussert et al., published Jun. 1, 2006, discloses a help system, automation device with a help system and method for providing help data. The invention relates to a help system. The help system comprises a first help facility which is preferably installed as part of an application on a data processing device, the first help facility providing a user with help data on the basis of context data defined by the user, in particular on the basis of search terms, said help data being stored in the first help facility and thus on the data processing device. A second help facility is provided according to the invention, which is accessed by the data processing device preferably via the internet such that the context data defined by the user in relation to the first help facility is automatically adopted in the second help facility as context data, the second help facility providing the user with additional help data based on this context data, said help data being stored in the second help facility.

U.S. Patent Application Publication No. 2006/0036566 by Simske et al., published Feb. 16, 2006, discloses systems, methods, and programs embodied in a computer readable medium for index extraction. An extraction of a plurality of sets of indices from a document in a server is implemented using a plurality of indexing entities. Each set of indices is extracted using a corresponding one of the indexing entities. Attempts are made to obtain a composite set of indices from the sets of indices extracted. The composite set of indices is associated with the document if the composite set of indices is successfully obtained from the sets of indices.

U.S. Patent Application Publication No. 2005/0210063 by Koenig, published Sep. 22, 2005, discloses a data structure for storing data including a number of files which each have a file header and a file body. The file header of a respective file contains general information with respect to the respective content of the respective file body of the respective file. Further, the file header of a respective first file additionally contains context information with respect to at least one further file, the file body of which exhibits a material reference to the content of the file body of the respective first file. The file structure and a method are proposed for creating and storing a file which allow an observer to determine in a particularly simple manner the volume and content of the information relevant for the file.

U.S. Patent Application Publication No. 2005/0197885 by Tam et al., published Sep. 8, 2005, discloses a system and method for allowing users to participate in a campaign, preferably using SMS messaging. The system includes a first layer configured to receive information from a user via a user interface, a second layer configured to extract data relevant to the campaign from the information received by the first layer, and a third layer configured to compare the extracted data to requirements of the campaign and, if the extracted data complies with the requirements of the campaign, to store the extracted data in a database associated with the campaign.

U.S. Patent Application Publication No. 2005/0177541 by Wright et al., published Aug. 11, 2005, discloses a system and method which allows users to track and manage the information gathered during the life of a project. The invention uses a novel method and system for tracking changes to processes within a project. A statistical analysis is done on the changes and the statistical information is merged with the existing process information to create a new version of the process. The information is then stored in a process library. As the new processes are used, the information stored is more accurate based on the previous analysis.

U.S. Pat. No. 6,973,616 B1 by Cottrille et al., issued Dec. 6, 2005, discloses a computing system capable of associating annotations with millions of content sources is described. An annotation is any content associated with a document space. The document space is any document identified by a document identifier. The document space provides the context for the annotation. An annotation is represented as an object having a plurality of properties. The annotation is associated with a content source using a document identifier property. The document identifier property identifies the content source with which the annotation is associated. A scalable computing system for managing annotations responds to requests for presenting annotations to millions of documents a day. The computing system consists of multiple tiers of servers. A tier I server indicates whether there are annotations associated with a content source. A tier II server provides an index to the body of the annotations. A tier III server provides the body of the annotation.

U.S. Pat. No. 6,516,320 by Odom et al., issued Feb. 4, 2003, discloses a memory for access by a program being executed by a programmable control device includes a data access structure stored in the memory, the data access structure including a first and a second index structure (each having a plurality of entries) together forming a tiered index. At least one entry in the first structure indicates an entry in the second structure. The number of entries in the second structure is dynamically changeable. A method for building a tiered index structure includes building a first-level index structure having a predetermined number of entries, building a second-level index structure having a dynamic number of entries, and establishing a link between an entry in the first-level index structure and an entry in the second level index structure.

U.S. Pat. No. 5,301,314 by Gifford et al., issued Apr. 5, 1994, discloses a computer-aided customer support system is described for rapidly retrieving stored documents useful in answering customer inquiries. A hierarchical index tree is used in which an indexing document is referenced at each level as the search proceeds down through the various tiers. Once the targeted document is retrieved and reviewed, the user is interrogated by the system as to the usefulness of the document in solving the customer's inquiry. Based on the response to this interrogation, the usefulness priority and location of this document within the tree structure are reevaluated.

U.S. Pat. No. 5,960,200 by Eager et al., issued Sep. 28, 1999, discloses that an automated system transitions an entire enterprise to a distributed infrastructure. The system includes a process for organizing and managing the transition, a multi-tiered client/server architecture that adheres to open systems standards, a system to automate the transition of existing applications to this architecture, and a system to enable the creation or modification of applications based on this architecture.

U.S. Pat. No. 5,530,861 by Diamant et al., issued Jun. 25, 1996, discloses a task manager for providing personal organization, project management, and process automation capabilities. The task manager maintains a hierarchical list of tasks for an individual. For each task, notes can be kept, priorities set, and progress tracked. Also, subsets of the task hierarchy can be shared. Every task in the task manager belongs to a class, and each class includes pre-defined automatic actions and manual actions. The pre-defined automatic actions are automatically executed by the task manager when the task is being worked on. The manual actions aid in task execution because the relevant operations (that is, the manual actions) are available when the task is being worked on. The task manager communicates with agents, tools, and process engines via a message system. The agents, tools, and process engine may receive task information from the task manager and may also remotely control the task manager.

In view of the foregoing, there is a need in the art for systems and methods to effectively determine the requirements and importance of a data object, such as a file or document, and to manage the object according to its determined requirements and importance. There is further a need for such systems and methods to operate such that the importance of an object includes the likelihood that it will be used in the near future, or the value that it can bring to an organization. These and other needs are met by the present invention as detailed hereafter.

SUMMARY OF THE INVENTION

Programs, systems and methods are described for efficiently storing data as used under a workflow-driven model. A workflow process is defined to control the processing of data objects through different states, e.g., such as an insurance claim document passing through different stages of processing. The workflow process is modeled and employed to manage the storage system based upon predicted state changes derived from state statistics that can be applied to enhance efficiency. For example, copies of the data object may be automatically made when the data object is expected to change state. Some anticipated states implicating high access may direct a storage location with low access time. Hints or requirements for the data object may be applied upon occurrence of an expected state change. Storage management of expected state changes may be further enhanced through dynamic adjustment of the state statistics using collected historical state information to further enhance efficiency.

A typical embodiment of the invention comprises a computer program embodied on a computer readable medium, including program instructions for receiving an data object in a data storage system to be managed in a workflow process, program instructions for determining an expected change to the state of the workflow process corresponding to the received data object based upon one or more state statistics, and program instructions for managing storage of the received data object within the data storage system based on the expected change to the state of the workflow process corresponding to the received data object. Managing storage of the received data object may comprise determining a storage location for the data object within the data storage system based on the expected change to the state of the workflow process corresponding to the received data object or determining a number of data object copies of the data object to be stored within the data storage system based on the expected change to the state of the workflow process corresponding to the received data object. In addition, managing storage of the received data object may also comprise determining a priority for the data object to be retrieved from the data storage system based on the expected change to the state of the workflow process corresponding to the received data object.

Further embodiments of the invention include program instructions for collecting information about historical state changes of the workflow process, and program instructions for applying the collected information about historical state changes of the workflow process to adjust the one or more state statistics. Applying the collected information about historical state changes of the workflow process to adjust the one or more state statistics may comprise applying a weighting parameter to determine a new state statistic by combining of a recent state statistic and a past state statistic and the recent state statistic and the past state statistic are each measured over an epoch interval.

In some embodiments of the invention, managing storage of the received data object may be based upon defined requirements for management of the data object in the storage system that must be made effective upon occurrence of the expected change to the state. Further, managing storage of the received data object may be based upon defined hints for management of the data object in the storage system that may be optionally applied to enhance efficiency of the storage upon occurrence of the expected change to the state.

In a similar manner, a typical method embodiment of the invention comprises the steps of receiving an data object in a data storage system to be managed in a workflow process, determining an expected change to the state of the workflow process corresponding to the received data object based upon one or more state statistics, and managing storage of the received data object within the data storage system based on the expected change to the state of the workflow process corresponding to the received data object. Method embodiments of the invention may be further modified consistent with program and system embodiments described herein.

Furthermore, a typical system embodiment of the invention comprises a workflow engine for defining a workflow process for one or more data objects, a workflow monitor for tracking activity associated with the one or more data objects and updating state information associated with the one or more data objects, an information manager for maintaining the state information received from the workflow monitor, a phase change detector for detecting a change in the state information associated with each of the one or more data objects maintained by the information manager, and a storage manager for determining an expected change to the state of the workflow process corresponding to the received data object based upon one or more state statistics and managing storage of the one or more data objects within the data storage system based on the expected change to the state of the workflow process corresponding to the one or more data objects. System embodiments of the invention may be further modified consistent with program and method embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Workflow and State Information

Embodiments of the invention provide a way to effectively determine the requirements and importance of a data object, such as a file or document, and to manage the object according to its determined requirements and importance. The importance of an object includes the likelihood that it will be used or used in the near future (i.e., that the object will transition to an expected state), or the value that it can bring to an organization. To achieve this, embodiments of the invention can use an associated workflow to associate management information, such as requirements and importance, with an object, and handle the object based on the associated management information.

Workflow refers to a means for information to flow seamlessly to the intended recipient and typically includes the means to route information, e.g. documents and memos, in a timely manner to users or groups of users having different roles. Workflow is an integral part of many Content Management solutions, including the IBM DB2 Content Manager, WebSphere MQ Workflow, and other known systems. Typically, an administrator or a business analyst defines a specific business process as a workflow comprising a graph of interconnected steps. After a workflow has been defined, data objects are routed through a process that assigns work to individuals or groups for processing until the entire workflow has been completed.

Figure 1A:
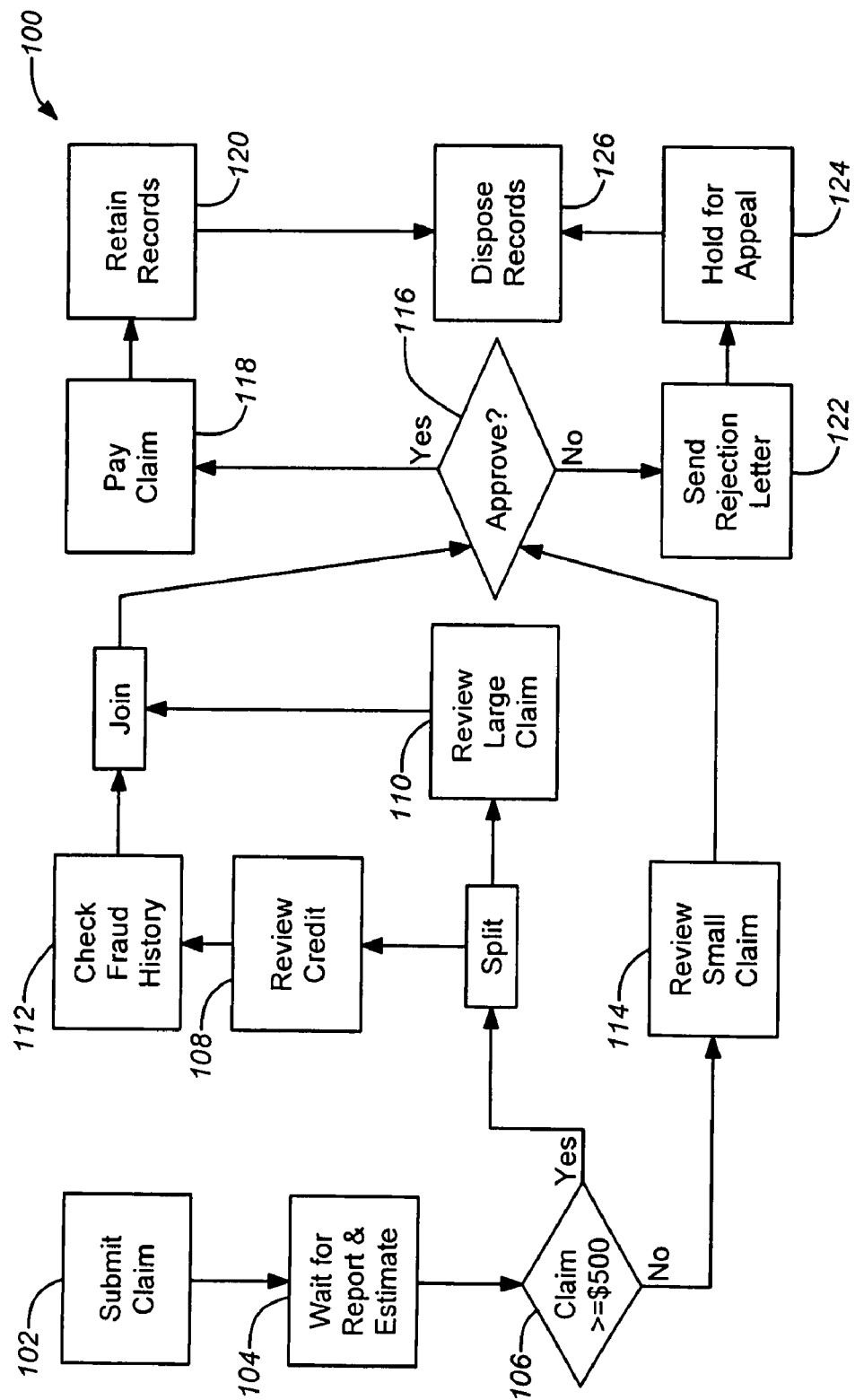
FIG. 1A illustrates a simplified workflow of an example automotive insurance claim process.

FIG. 1A illustrates a simplified workflow 100 of an example automotive insurance claim process of a specific business. First, the workflow receives the submitted claim 102. Next, the workflow waits for a report and an estimate 104. After the claim estimate has been input, a decision block 106 is encountered. If the claim is greater than or equal to $500, then the workflow branches one way, and if the claim is less than $500, then it branches another way. If the claim is greater than $500, the credit is reviewed 108 at the same time the large claim as a whole is reviewed 110. After the credit is reviewed 108, the fraud history is reviewed 112. If the claim is less than $500 the small claim is reviewed 114. Next is a decision block 116 regarding approval of the claim. If the claim is approved, the claim is paid 118, and a record is retained 120. On the other hand if the claim is rejected, a rejection letter is sent 122, and the workflow holds for an appeal 124. After a considerable amount of time, the records are disposed of 126. Those skilled in the art will appreciate that similar workflow descriptions may be defined for any other type of business that requires the movement of information in the performance of the business; embodiments of the invention are not limited to the example automotive insurance claim process described.

Various embodiments of the invention can incorporate a number of different aspects. One example embodiment of the invention can include the operations of receiving an object to be managed in a workflow, identifying a state in the workflow corresponding to the received object, monitoring the activity against the received object, updating information associated with the identified state of the workflow, such information being useful for managing objects associated with the state, and managing the received object based on the information associated with the identified state of the workflow. Management of the objects within the storage system is enhanced by anticipating state changes that are expected to occur and handling the objects in the storage system to improve overall efficiency.

One aspect of the invention involves using the state statistics to predict the path of a document through the workflow, and to optimize the storage of the document accordingly. Furthermore, the state statistics may be dynamically adjusted by collecting information about the dynamic flow of a workflow, such as the length of time spent in a given state of the workflow, the probability of branching to a given state of the workflow, and other trackable state properties, and then applying the collected information to predict the path of a document through the workflow, and to optimize the storage of the document accordingly.

Managing the received object may include determining whether the object should be stored in a first tier storage (e.g., high-end disk array) or a second or a third tier storage (e.g., low-end disk array or tape) based upon and expected state change. Managing the received object may also include deciding the number of copies of the object to maintain and whether the object should be remotely replicated. Managing the received object can further include deciding the order in which the received object should be retrieved from a remote or backup system.

Figure 1B:
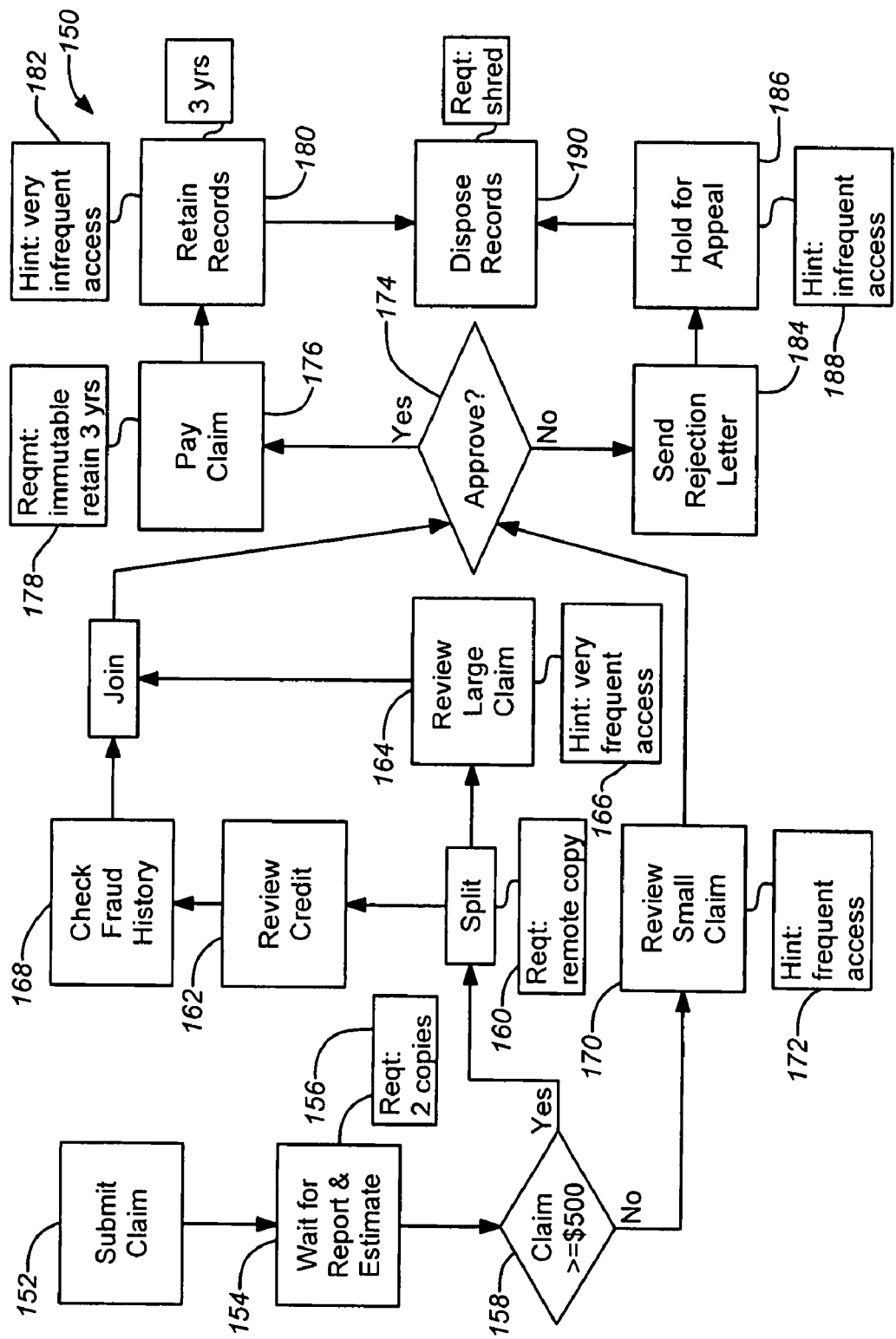
FIG. 1B illustrates a simplified workflow of an example automotive insurance claim process with some of the hints and requirements that could be associated with a workflow.

FIG. 1B illustrates a workflow 150 with some of the requirements and hints that could be associated with the example automotive insurance claim workflow 100 presented in FIG. 1A. First, the workflow receives the submitted claim 152. Then, the workflow waits for a report and an estimate 154. During this step there is a requirement 156 of two copies to be made by the storage manager. This step must be satisfied before the workflow can proceed. After the claim estimate has been input, a decision block 158 is encountered. If the claim is greater than or equal to $500, then the workflow branches one way, and if the claim is less than $500, then it branches another way. If the claim is greater than $500, a requirement for a remote copy 160 is issued to the storage manager. The credit is reviewed 162 at the same time the large claim as a whole is reviewed 164. During the step where the large claim is being reviewed, there is a hint 166 to the storage manager that there may be frequent access to information. After the credit is reviewed 162, the fraud history is reviewed 168. If the claim is less than $500 the small claim is reviewed 170, during which, there is a hint 172 given to the storage manager that there may be frequent access to information at this step. Next is a decision block 174 regarding approval of the claim. If the claim is approved, the claim is paid 176, at which point there is a requirement 178 that the storage manager cannot change the information for three years. Afterward, a record is retained 180, which has a hint 182 to the storage manager that there will probably be very little access to that information in the next three years. If the claim is rejected, a rejection letter is sent 184, and the workflow holds for an appeal 186. A hint 188 is issued regarding infrequent access to the information over the next 1.2 months. After the records are held for the appropriate amount of time, they are disposed of 190, and the requirement 192 to the storage manager is to shred the record.

Embodiments of the invention utilizes information to associate with the state in the workflow. The administrator or business analyst may specify information to associate with the state in the workflow. In one embodiment, the information manager maintains at least two kinds of information, requirements and hints. Requirements must be satisfied by the storage manager, while hints are advisory to the storage manager.

The information may be non-procedural or declarative, meaning that the information relates to a goal for the storage manager to achieve rather than a way to achieve the goal. For example, the information might indicate that the system should be capable of satisfying infrequent access to an object rather than specify that the object should be stored in tape storage. By using a non-procedural approach, the details and complexity of the storage configuration can be masked from the information manager.

The workflow monitor can be used to track the activity associated with the state in the workflow. For example, it monitors accesses to the object associated with the state, and when the workflow enters or leaves the state. In particular, the system may maintain statistics on the frequency of access to the object associated with the state and the length of time the workflow remains in the state.

2. Hardware Environment

Figure 2A:
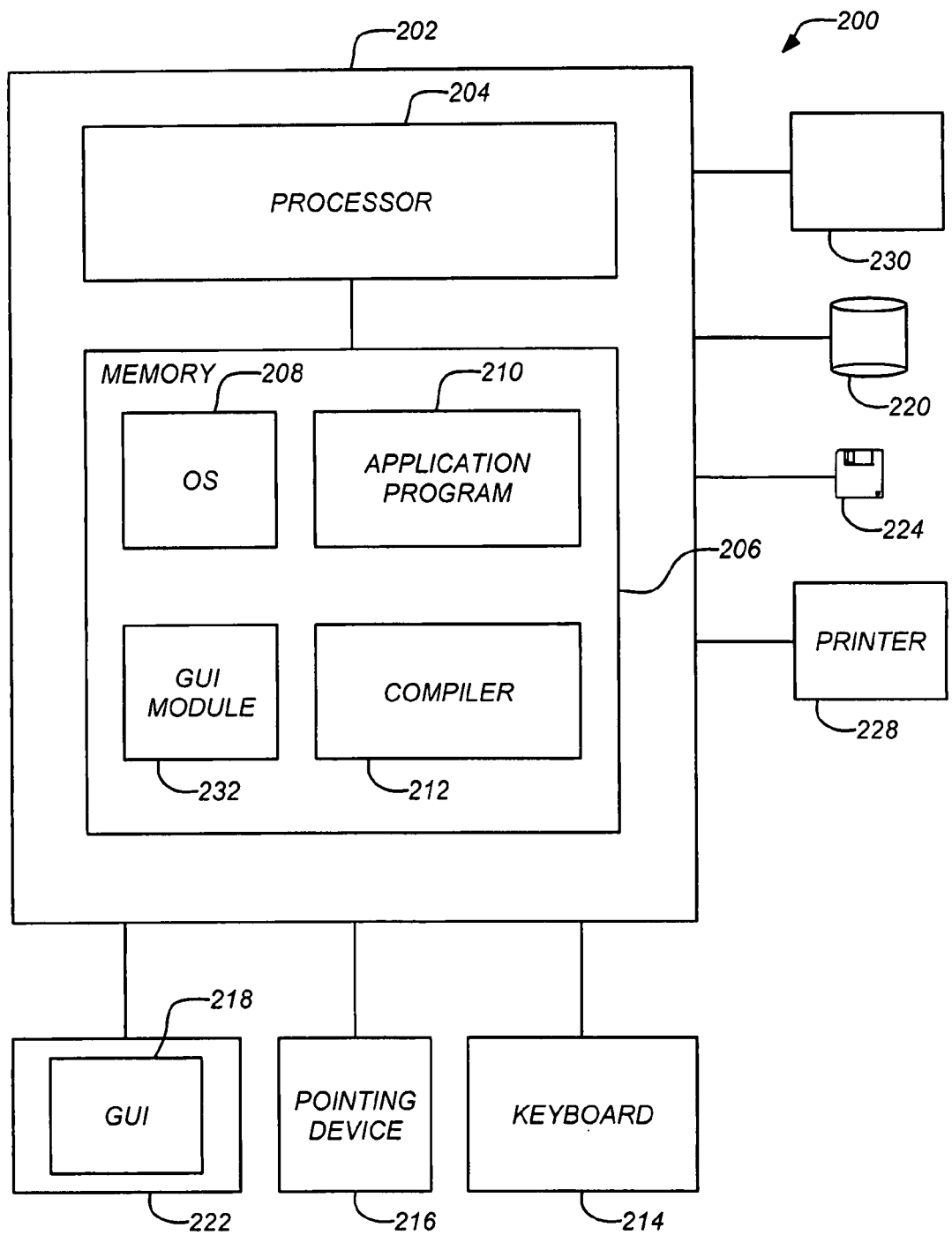
FIG. 2A illustrates an exemplary computer system that can be used to implement embodiments of the invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that includes functions for monitoring a workflow of data objects and managing storage of the data objects in a storage system, particularly a storage system operating over a distributed computing network. The network may encompass one or more computers connected via a local area network and/or Internet connection (which may be public or secure, e.g. through a VPN connection), or via a Fibre Channel Storage Area Network or other known network types as will be understood by those skilled in the art.

Figure 2B:
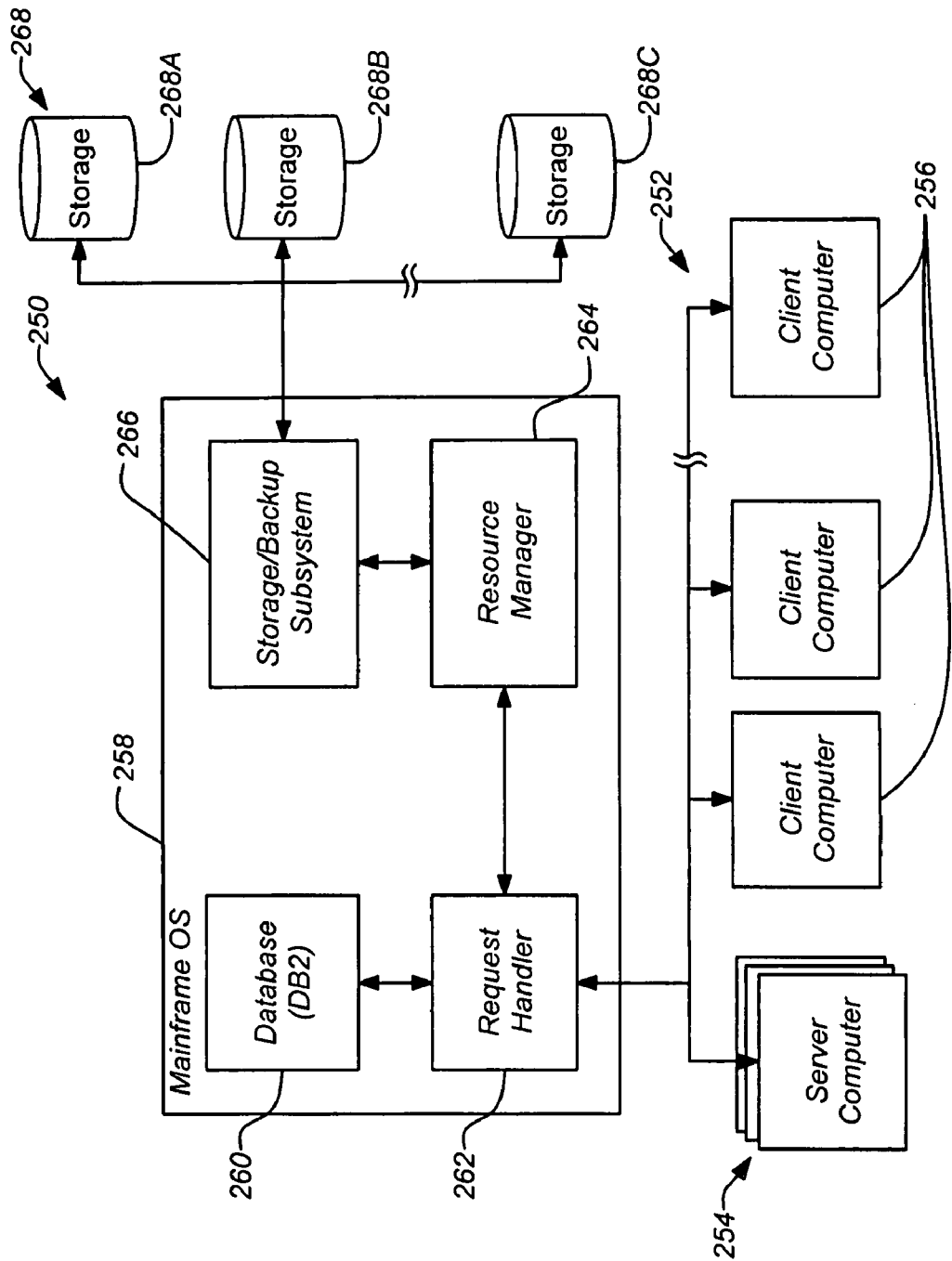
FIG. 2B illustrates an exemplary network of computing devices that can be used to implement embodiments of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Figure 2C:
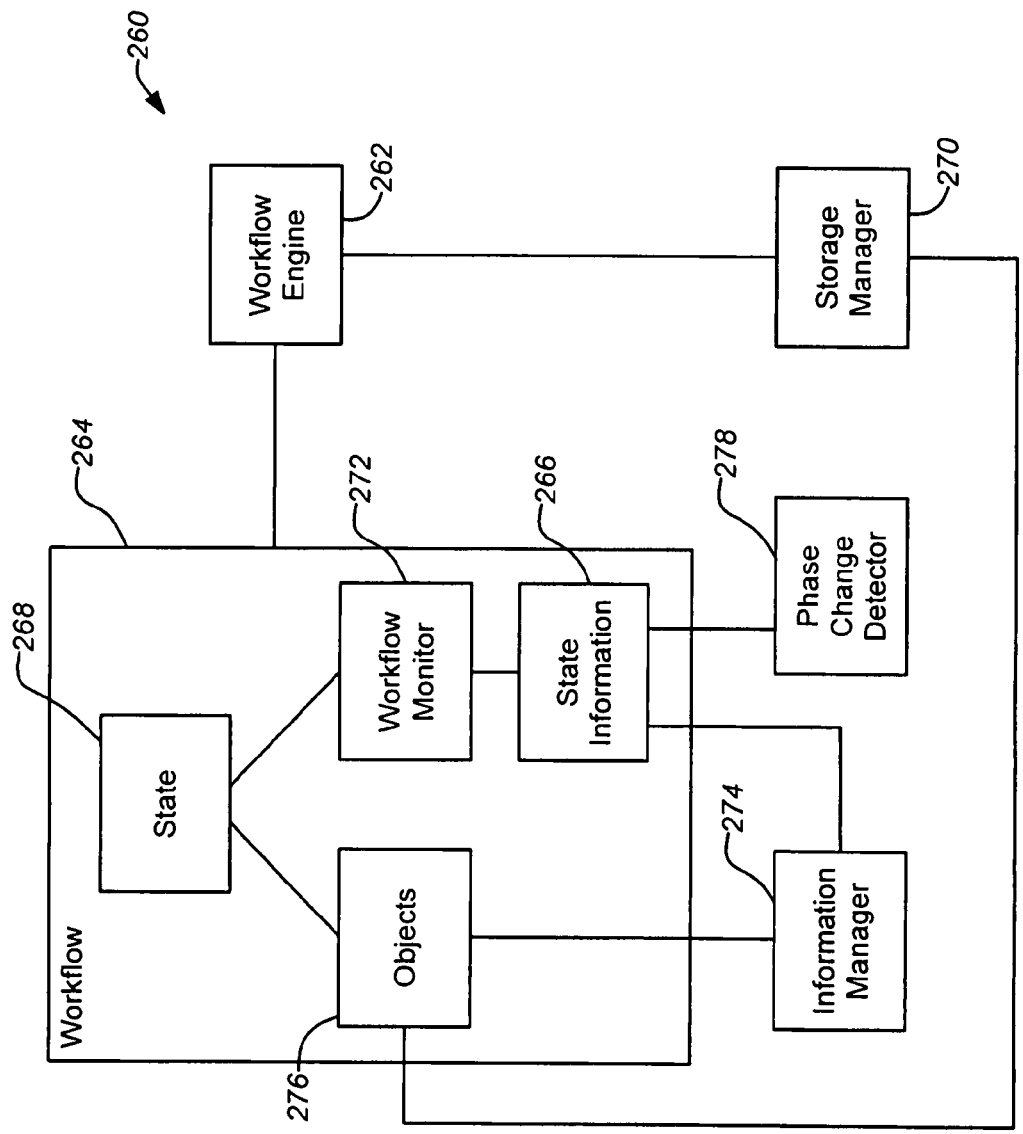
FIG. 2C illustrates an exemplary embodiment of a workflow-driven data storage system.

FIG. 2C illustrates an exemplary system 260 for managing a workflow-driven data storage operation. The workflow engine 262 allows an administrator or business analyst to define a workflow 264 to model a real-world process. Runtime capabilities may also be provided such as routing data objects through the workflow 264. It further allows the administrator or business analyst to associate information 266 with a state 268 in the workflow 264, and provides the information 266 to the storage manager 270 for use in managing a data object associated with the state 268. The information 266 is relevant to storage decisions respecting the data objects, e.g. how long, how many copies, how frequent are accesses. The workflow monitor 272 tracks the activity associated with the state 268 in the workflow 264 and updates the information 266 associated with the state accordingly. In one embodiment, the frequency of access of the object 276 associated with the state 268 is monitored. In some embodiments, the time (an instance of) a workflow 264 spends in the state 268 may be recorded (e.g. to be employed in lookahead and/or dynamic adjustment processing described hereafter). The information manager 274 maintains the information 266 associated with the state 268 in the workflow 264. In one embodiment, the information manager 274 also tracks the objects 276 associated with the state 268. The phase change detector 278 detects changes in the information 266 associated with the state 268 in the workflow 264. The storage manager 270 uses the information 266 associated with the state 268 in the workflow 264 to determine optimum management the object 276 associated with the state 268. It should be noted that the various functions of the distinct modules described in the exemplary system 260 above may be implemented together in any different combination.

Embodiments of the invention may also be further enhanced through the use of a lookahead process to anticipate state changes. In addition, the lookahead process may be dynamically adjusted to further improve efficiency. As described in the following sections, these processes can further improve the storage management efficiency of the workflow data objects.

3. Lookahead Process

When the workflow enters a particular state, the information associated with the state may be provided to the storage manager. The workflow engine can look ahead to a most likely next state and provide the information associated with the most likely next state to the storage manager. The workflow engine may further provide the expected time to the next state to the storage manager. In some embodiments, the workflow engine may look ahead to determine a future state wherein the associated information is different. It provides both the expected time to the future state and the information associated with the future state to the storage manager. In any case, the storage manager can employ the information and the expected time to the future state change to further improve efficiency regarding storage of the applicable data object.

In some cases, the workflow engine can determine whether to provide the information associated with the state to the storage manager based on the length of time the workflow is expected to remain in the state. For example, if the statistics indicate that the average residency time in the state is below some threshold, the workflow engine may decide not to provide hint information to the storage manager. In some embodiments, the workflow engine can determine whether to provide the information associated with the state to the storage manager based on when it expects the information to change and the expected change (e.g., degree, direction) in the information. For example, if the statistics indicate that a requirement will be relaxed by an amount below some threshold after the workflow traverses several states with total residency time above some threshold, the workflow engine may decide not to provide the requirement information to the storage manager.

As described, the lookahead process can reduce the volume of information provided to the storage manager and enable the storage manager to schedule its operations more efficiently. For example, if the storage manager is informed to anticipate deletion of a particular data object (document), the storage manager may be able to reduce unnecessary management actions, such as migrating a document to tape just before the document is actually deleted.

4. Dynamic Adjustment

In some embodiments, the information associated with the state can be associated with the objects corresponding to the state and provided to the storage manager on demand, such as when the administrator issues a command, or when storage space is needed in tier one storage, or when the requirements associated with the state is changed. In some cases, the information is provided periodically to the storage manager. Alternately, there may be a constant background process that continuously provides the information to the storage manager.

In some embodiments, when the phase change detector detects changes in the information associated with the state, the information manager associates the new information with the objects corresponding to the state and provides the new information to the storage manager. The system can also use the lookahead capability described earlier to decide whether to provide the new information to the storage manager.

In some embodiments, the information manager can divide time into epochs when measuring statistics corresponding to state changes, which can be measured in real time (wall clock time) or virtual time, such as the number of workflows entering the state. The system then maintains statistics on an epoch basis. At the end of an epoch, the information manager ages the previous value of the statistic before adding the value obtained in the epoch. For example, it sets $$\text{Count}_{new} = \alpha \text{Count}_{current} + (1-\alpha)\text{Count}_{old}$$

where $\text{Count}_{new}$ is the statistic value to be used to provide information to the storage manager, $\text{Count}_{current}$ is the statistic value collected during the epoch, $\text{Count}_{old}$ is the previous statistic value of $\text{Count}_{new}$ and $0 \leq \alpha \leq 1$.

The parameter $\alpha$ controls the relative weight placed on the current statistic value and those obtained in the past. For example, with an $\alpha$ value of 1, only the most recent statistic value is considered. In one embodiment, if the new value of a statistic differs from the previous statistic value by more than some threshold, the phase change detector flags the statistics as having undergone a phase change.

In some embodiments, the system reduces the overhead of the lookahead capability by precomputing information at the end of an epoch. For example, it determines and remembers when the information associated with the state is expected to change and the expected change in the information.

While we have described the invention by focusing on a specific workflow, it should be apparent that embodiments of the invention apply to any process involving data objects wherein the process flow is governed largely by predetermined rules. It should also be clear that embodiments of the invention can be applied to other requirements, measures of importance, and statistics than those that have been explicitly described herein as shall be understood by those skilled in the art. It should further be apparent that the requirements and measures of importance obtained employing an embodiment of the invention can be combined with those obtained with other methods to manage the data objects. In addition, a system may be implements in accordance with an embodiment of the invention for managing a subset of the data objects (e.g., those associated with a workflow) while relying on other methods for managing the remaining data objects.

5. Method of Applying Requirements/Hints upon State Change in Workflow

Figure 3:
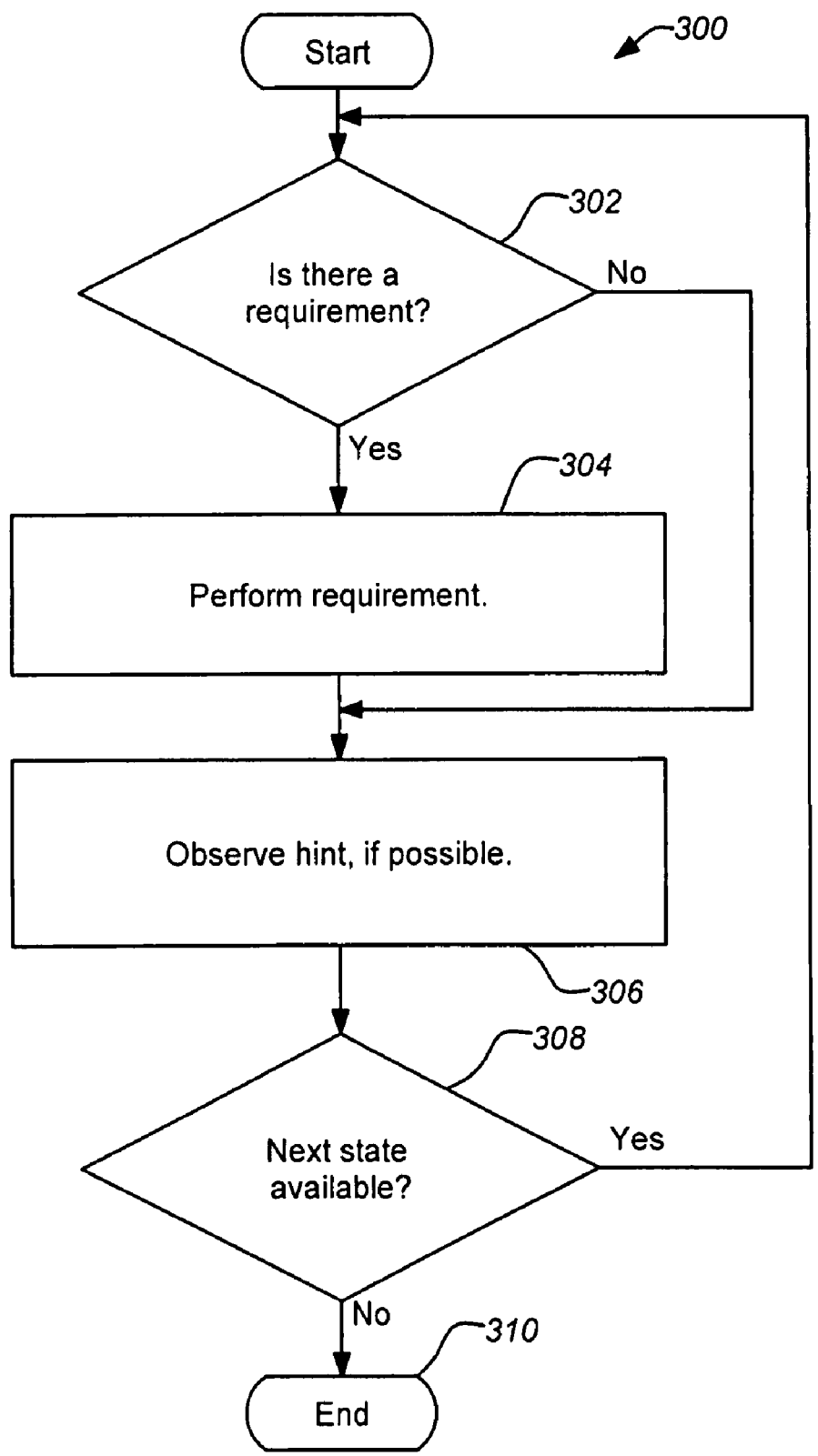
FIG. 3 shows a flowchart of an exemplary method of storing data under a workflow-driven process.

FIG. 3 is a flowchart displaying the steps involved in an exemplary method 300 embodiment of the invention. First, the object looks to see if there is a requirement 302 that needs to be performed by the storage manager. If there is a requirement that needs to be performed, it is done 304, and then moves on to the next step. If there is no requirement, the object simply moves on to the next step. The object then checks to see if there is a hint available to be observed 306. The storage manager should follow the hint, but it is not absolutely necessary. Then, the object checks to see if there is a next state 308. If so, the object repeats the flowchart back at step 302. If not, the process is finished 310.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a non-transitory computer readable medium, comprising:
    program instructions for receiving a data object in a data storage system to be managed in a workflow process including a plurality of states;
    program instructions for determining an expected change to the state of the workflow process corresponding to the received data object based upon a plurality of state statistics, wherein the plurality of state statistics track activity associated with the plurality of states in the workflow process comprising of a length of time the workflow process remains in each of the plurality of states, the probability of branching to a given state of the workflow, and the frequency of access to the data object associated with one or more states;
    program instructions for collecting information about historical state changes of the workflow process;
    program instructions for applying the collected information about historical state changes of the workflow process to adjust the plurality of state statistics, wherein the applying the collected information comprises determining a new state statistic by using a recent state statistic and a past state statistic; and
    program instructions for managing storage of the received data object within the data storage system based on the expected change to the state of the workflow process corresponding to the received data object.

2. The computer program of claim 1, wherein managing storage of the received data object comprises determining a storage location for the data object within the data storage system based on the expected change to the state of the workflow process corresponding to the received data object.

3. The computer program of claim 1, wherein managing storage of the received data object comprises determining a number of data object copies of the data object to be stored within the data storage system based on the expected change to the state of the workflow process corresponding to the received data object.

4. The computer program of claim 1, wherein managing storage of the received data object comprises determining a priority for the data object to be retrieved from the data storage system based on the expected change to the state of the workflow process corresponding to the received data object.

5. The computer program of claim 1, wherein managing storage of the received data object is based upon defined requirements for management of the data object in the storage system that must be made effective upon occurrence of the expected change to the state.

6. The computer program of claim 1, wherein managing storage of the received data object is based upon defined hints for management of the received data object in the data storage system that may be optionally applied to enhance efficiency of the data storage system upon occurrence of the expected change to the state of the workflow process.

7. A method, comprising the steps of:
    receiving a data object in a data storage system to be managed in a workflow process that includes a plurality of states;
    determining an expected change to the state of the workflow process corresponding to the received data object based upon a plurality of state statistics, wherein the plurality of state statistics track activity associated with the plurality of states in the workflow process comprising of a length of time the workflow process remains in each of the plurality of states, the probability of branching to a given state of the workflow, and the frequency of access to the data object associated with one or more states;
    collecting information about historical state changes of the workflow process;
    applying the collected information about historical state changes of the workflow process to adjust the plurality of state statistics, wherein the applying the collected information comprises determining a new state statistic by using a recent state statistic and a past state statistic; and
    managing storage of the received data object within the data storage system based on the expected change to the state of the workflow process corresponding to the received data object.

8. The method of claim 7, wherein managing storage of the received data object comprises determining a storage location for the received data object within the data storage system based on the expected change to the state of the workflow process corresponding to the received data object.

9. The method of claim 7, wherein managing storage of the received data object comprises determining a number of data object copies of the received data object to be stored within the data storage system based on the expected change to the state of the workflow process corresponding to the received data object.

10. The method of claim 7, wherein managing storage of the received data object comprises determining a priority for the data object to be retrieved from the data storage system based on the expected change to the state of the workflow process corresponding to the received data object.

11. The method of claim 7, wherein managing storage of the received data object is based upon defined requirements for management of the data object in the storage system that must be made effective upon occurrence of the expected change to the state.

12. The method of claim 7, wherein managing storage of the received data object is based upon defined hints for management of the received data object in the data storage system that may be optionally applied to enhance efficiency of the storage upon occurrence of the expected change to the state of the workflow process.

13. A system, comprising:
- a workflow engine for defining a workflow process including a plurality of states for one or more data objects;
- a workflow monitor for tracking activity associated with the one or more data objects and updating state information associated with the one or more data objects;
- an information manager for maintaining the state information received from the workflow monitor;
- a phase change detector for detecting a change in the state information associated with each of the one or more data objects maintained by the information manager;
- a storage manager for determining an expected change to the state of the workflow process corresponding to the received data object based upon a plurality of state statistics, wherein the plurality of state statistics track activity associated with the plurality of states in the workflow process comprising of a length of time the workflow process remains in each of the plurality of states, the probability of branching to a given state of the workflow, and the frequency of access to the data object associated with one or more states and managing storage of the one or more data objects within the data storage system based on the expected change to the state of the workflow process corresponding to the one or more data objects; and
- wherein the information manager collects information about historical state changes of the workflow process and applies the collected information about historical state changes of the workflow process to adjust the plurality of state statistics, wherein the applying the collected information comprises determining a new state statistic by using a recent state statistic and a past state statistic.

14. The system of claim 13, wherein the storage manager determines storage locations for the one or more data objects within the data storage system based on the expected change to the state of the workflow process corresponding to the one or more data objects.

* * * * *